United States Patent [19]

Clemens et al.

[11] 3,944,507

[45] Mar. 16, 1976

[54] METHOD OF PREPARING RESINS CONTAINING SULFONIC ACID FUNCTIONALITY INVOLVING OXIDATION OF THIOURONIUM SALTS WITH HYDROGEN PEROXIDE

[75] Inventors: David H. Clemens, Willow Grove, Pa.; Raymond J. Lange, Wheelersburg, Ohio

[73] Assignee: Rohm and Haas Company, Philadelphia, Pa.

[22] Filed: Jan. 15, 1975

[21] Appl. No.: 540,773

[52] U.S. Cl. ........ 260/2.1 R; 260/79.3 R; 260/2.2 R
[51] Int. Cl.$^2$ ............................................ C08F 8/06
[58] Field of Search .......... 260/505 R, 2.2 R, 2.1 R, 260/552 A, 79.5 NV, 79, 79.3 R

[56] References Cited

UNITED STATES PATENTS

| | | | |
|---|---|---|---|
| 2,559,585 | 2/1946 | Beck et al. | 260/505 R |
| 2,868,738 | 1/1959 | Hwa | 260/2.2 R |
| 3,670,002 | 6/1972 | Sheng et al. | 260/505 R |

*Primary Examiner*—Harry Wong, Jr.
*Assistant Examiner*—Peter F. Kulkosky

[57] ABSTRACT

Resins containing sulfonic acid functionality may be prepared by reacting a chloromethylated polymer matrix with thiourea and then oxidizing the resulting isothiouronium salt to the sulfonic acid in the presence of hydrogen peroxide, either directly or with the intermediate isolation of the thiol.

6 Claims, No Drawings

METHOD OF PREPARING RESINS CONTAINING SULFONIC ACID FUNCTIONALITY INVOLVING OXIDATION OF THIOURONIUM SALTS WITH HYDROGEN PEROXIDE

This invention concerns the novel preparation of a sulfonic acid resin. More particularly, it concerns the preparation of such a resin by reacting a chloromethylated polymeric matrix with thiourea and then further oxidizing the resulting isothiouronium chloride in the presence of hydrogen peroxide to the sulfonic acid resin. Preferred embodiments include the preparation of poly(vinylbenzyl) sulfonic acid resins either by directly oxidizing the isothiouronium salt or obtaining the sulfonic acid resin through the intermediate isolation of the poly(vinylbenzyl) thiol.

The term chloromethylated as used herein denotes the presence of $CH_2Cl$ groups on the side chains of the polymeric matrix.

It should be noted that the resins as prepared according to the invention may be utilized as ion exchange resins, chelating resins, adsorbents or they may have specific utility as catalytic resins. The resins of the invention may be macroreticular in nature or they may have a gellular structure.

The sulfonic acid resins which are the product of the process of the invention are themselves not novel. Resins of this type have been prepared by a variety of mechanisms. None of these techniques however offer the economic advantage or safety that the process of the invention may show. For example, poly(vinylbenzyl) sulfonic acid may be obtained by a reaction of poly(vinylbenzyl) methylsulfonium chloride as shown by the following mechanism.

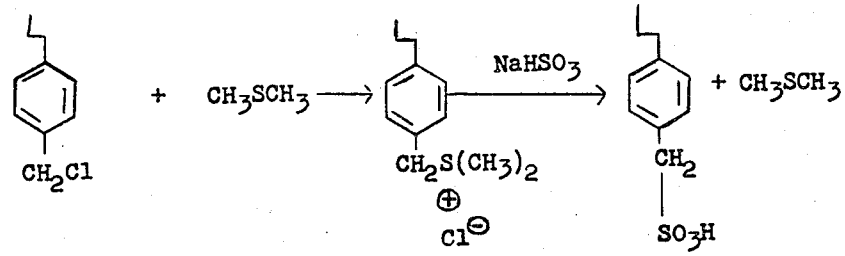

This method of preparation of sulfonic acid resins is further described in U.S. Pat. No. 3,300,416.

Another method of preparing the sulfonic acid resins comprises the reaction of amine adducts of poly(vinylbenzyl) chloride with sodium sulfite. This technique, described in U.S. Pat. No. 3,277,025 is illustrated by the following mechanism.

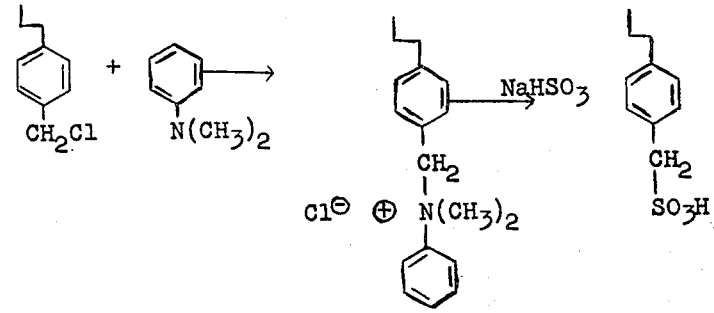

Both of these reactions unfortunately suffer some disadvantages. The former technique is hampered by the formation of dimethyl sulfide, a highly odiferous compound which is potentially toxic in nature. The latter technique inherently possesses a distinct economic disadvantage in that high temperatures are required to promote the reaction, and an amphoteric resin frequently results due to incomplete conversion of the reactants.

In the constant search of today's industry for optimum processes, the surprising discovery of the present invention provides a distinct advantage to the art.

It is therefore an objective of the present invention to provide an economical process free of unnecessary and disadvantageous by-products for the manufacture of sulfonic acid resins. It is another objective of the invention to provide sulfonic acid resins which possess great thermal stability.

The present process which satisfies the above objectives has been made possible by the surprising discovery that poly(vinylbenzyl) sulfonic acid resins may be obtained when a halomethylated polymer matrix reacted with thiourea is oxidized in the presence of hydrogen peroxide. Although the invention is more specifically described particularly in the example with reference to a preferred embodiment of poly(vinylbenzyl) sulfonic acid, it should be clear to the skilled worker in the art that many variations in the chemical structure of the starting compounds and final products are possible without departing from the scope of the invention. For example, as an alternative to using an aromatic polymer matrix as starting compound the skilled worker in the art may, according to the invention, prepare resins having sulfonic acid functionality by the process of the invention using a variety of aliphatic or starting polymers. The only requirement a starting polymer must possess is its ability to support halomethylated groups, preferably chloromethylated. In general polymer matrices may include a crosslinked copolymer of (1) a polyunsaturated monomer, containing a plurality of non-conjugated $CH_2=C<$ groups, which acts as a crosslinking agent and (2) a monoethylenically unsaturated monomer.

Suitable polyunsaturated crosslinking agents include divinylbenzene, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'- methylenediacrylamide, N,N'methylene dimethacrylamide, N, N'-ethylenediacrylamide, trivinylbenzene, trivinylnaphthalene, polyvinylanthracenes and the polyallyl and polyvinyl ethers of glycol glycerol, pentacrythritol, resorcinol and the monothio or dithio derivatives of glycols.

Preferred crosslinking monomers include polyvinyl aromatic hydrocarbons, such as divinylbenzene and trivinylbenzene, glycol dimethacrylates, such as ethylene glycol dimethacrylate, and polyvinyl ethers of polyhydric alcohols, such a divinoxyethane and trivinoxypropane. The amount of crosslinking agent can be varied widely but since the total utilizable capacity of the final resin as an anionexchange resin decreases with an increase in the amount of crosslinking agent, an amount of about 2% to about 20%, and preferably about 3 to 10%, on a molar basis is usually adequate.

Suitable monoethylenically unsaturated monomers include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m- and p-methyl styrenes, and o-, m-, and p-ethyl styrenes, vinyltoluene and vinylnaphthalene. A class of monomers of particular interest consists of styrene and the esters of acrylic and methacrylic acid with a $C_1$-$C_{10}$ aliphatic alcohol.

The polymerization reaction is generally carried out in the presence of a catalyst. Suitable catalysts which provide free radicals to function as reaction initiators include benzoyl peroxide, t-butyl hydroperoxide, cumene hydroperoxide, tetralin peroxide, acetyl peroxide, caproyl peroxide, t-butyl perbenzoate, t-butyl diperthalate, methyl ethyl ketone peroxide.

The amount of peroxide catalyst required is roughly proportional to the concentration of the mixture of monomers. The usual range is 0.01% to 5% of catalyst with reference to the weight of the monomer mixture. The optimum amount of catalyst is determined in large part by the nature of the particular monomers selected, including the nature of the impurities which may accompany the monomers.

Another suitable class of free radical generating compounds which can be used as catalysts are the azo catalysts, including for example azodiisobutyronitrile, azodiisobutyramide, azobis($\alpha,\alpha$-dimethylvaleronitrile), azobis($\alpha$-methylbutyronitrile), dimethyl, diethyl, or dibutyl azobis(methylvalerate). These and other similar azo compounds, which serve as free radical initiators, contain an -N N- group attached to aliphatic carbon atoms, at least one of which is tertiary. An amount of 0.01% to 2% of the weight of monomer or monomers is usually sufficient.

In making the gel type resins, a wide variety of polymerization processes well known in the art can be used. However, the preferred method is emulsion or suspension polymerization in a liquid, such as water, which is not a solvent for the monomeric material. This method produces the polymer directly in the form of small spheroids or beads, the size of which can be regulated and controlled. By adjustments in the composition of the suspending medium and in the rate of agitation during polymerization, the suspension polymerization process can be made to produce spheroids or beads of a wide range of effective particle sizes.

In preparing thee macroreticular resins, the polymerization reaction is carried out in the presence of a precipitant which is a liquid (a) which acts as a solvent for the monomer mixture and is chemically inert under the polymerization conditions and (b) which is present in such amount and which exerts so little solvating action on the product crosslinked copolymer that phase separation of the product copolymer takes place as evidenced by the fact that the product copolymer is no more than semi-transparent and is preferably opaque when associated with a fluid having a different refractive index.

The determination of the most effective precipitant and the amounts required for the formation of a particular copolymer may vary from case to case because of the numerous factors involved. However, although there is no "universal" or single class of precipitants applicable to all cases, it is not too difficult to determine which precipitants will be effective in a given situation. The requirements of solubility with the monomer mixture and low solvating action on the product copolymer can be tested empirically and the solubilities of many monomers and copolymers are well known from publications and textbooks.

Crosslinked copolymers are generally insoluble, but, depending upon the degree of crosslinkage, they can be swollen by liquids which might be considered as being good "solvents" and if the product crosslinked copolymer is so solvated by a liquid that it undergoes swelling, then the liquid in question is unsuitable as a precipitant.

As a further guide in the selection of a suitable precipitant, reference may be made to scientific literature, for instance, as discussed in Hildebrand and Scott, Solubility of Non-Electrolytes, 3d. ed., New York, 1950. In general, it may be stated that sufficiently wide differences in the solubility parameters of copolymer and solvent, respectively, must exist for the precipitant to be effective and that, once an effective precipitant has been located, the behaviour of many liquids can be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogenous when some components are present in only minor amounts; but, if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practicle reasons since the rate of copolymerization may decrease and the space-time yields become low. In many cases, the amount of precipitant employed may be between 25 percent and 60 percent of the total weight of the monomer mixture and the precipitant.

The amount of precipitant liquid required to effect phase separation varies inversely with the degree of crosslinking of the copolymer so that the greater the crosslinker content the lesser is the amount of precipitant employed.

As stated above, the chemical character of the precipitant may vary appreciably, depending on the monomer mixture which is used. When employing aromatic hydrocarbon type monomers, such as, for instance, styrene and divinylbenzene, alkanols with a carbon atom content of from 4 to 10 will, if sufficient crosslinker is used, effect the desired phase separation when used in amounts of from 30% to 50% of the total weight of monomers and precipitant.

Saturated aliphatic hydrocarbons containing at least 7 carbon atoms, such as heptane and isooctane, may be employed as precipitants for aromatic hydrocarbon systems, such as styrene and divinylbenzene. The amounts employed can be varied, depending on the degree of crosslinkage, from 30% to 50% of the total weight of the monomers and precipitant.

When employing acrylic esters as the monounsaturated monomers, alkyl esters can be effectively employed as precipitants. Typical esters include n-hexyl acetate, 2-ethylhexyl acetate, methyl oleate, dibutyl sebacate, dibutyl adipate and dibutyl carbonate. The esters must have a carbon atom content of at least 7. The concentrations required will vary somewhat with the ester being used and with the amount of crosslinking monomer but from 30% to 50% based on the combined weight of the monomers and the precipitant will generally cause the desired phase separation and the formation of a macroreticular structure within the polymerized mass.

Higher aliphatic hydrocarbons containing at least 7 carbon atoms, such as heptane and isooctane, amy be employed as precipitants when employing acrylic esters as the monoethylenically unsaturated monomers. The amounts employed can be varied from 25% to 50% based on the combined weight of monomers and precipitant.

Many polymerization methods can be used in preparing these macroreticular resins. The preferred method, however, is suspension polymerization. In this case, an additional factor must be considered, namely, the solubility, i.e., miscibility, of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 20 grams per 100 grams of water can be employed, a low watersolubility is preferred because of handling ease, ease of recovery, and processing economies. As is well known, however, it is possible to decrease the water-solubilities of compounds by adding salts to the aqueous phase and this method also may be employed to decrease the watersolubilities of a precipitant liquid. The general position is that, when suspension polymerization is used, the precipitant must be either immiscible or only partially miscible with the suspending medium.

As noted hereinabove, the reaction product of the chloromethylated matrix and thiourea, namely, the isothiouronium salt may be directly oxidized in the presence of a suitable oxidizing agent such as hydrogen peroxide, or may be alternatively effected by forming the thiol by caustic hydrolysis of the isothiouronium salt and subsequently oxidizing this thiol in the presence of hydrogen peroxide and preferably acetic acid. The cation exchange resins prepared according to the method of the invention may exhibit strong acid cation exchange capacities of up to 3.7 meq./g. (dry) and have shown superior thermal stability when compared to conventional strong acid cation exchange resins. The thermal stability is demonstrated in the following Table I and is illustrated by the salt splitting cation capacity (SSCC) of the resin. Resin A is prepared according to the method of Example III.

Table I

| | Thermal Stability at 200°C. | |
| | SSCC | |
| | Amberlyst 15 | |
| Time (Hr.) | Comparative Resin | Resin A |
| --- | --- | --- |
| 0 | 4.79 | 3.52 |
| 100 | 0.70 | 1.64 |

The invention will now be described with reference to the following Example. All parts and percentages given in the Example and throughout the specification are by weight unless otherwise stated. The Examples in no way limit the invention but are merely for the purpose of illustration.

EXAMPLE I

Preparation of Poly(vinylbenzylisothiouronium chloride:DVB)

Chloromethylated Polymer A (40 g., 0.26 structural unit moles) is slurried in dioxane (250 ml). Polymer A comprises a macroreticular styrene DVB copolymer containing 3% divinylbenzene (DVB) comonomer and utilizing methyl isobutyl carbinol (MIBC) as an extender and in the amount of 42%. A mixture of thiourea in 2B ethanol (350 ml) is added. The mixture is refluxed for 25 hours. The product is washed with 2B ethanol. The resulting isothiouranium salt has the following characteristics:
12.4% S
10.82%, 10.73% N
12.87% Cl
50.87% C
5.69% H

EXAMPLE II

Preparation of Poly(vinylbenzyl thiol:DVB)

The above isothiouronium salt is slurried in 2B ethanol (200 ml.). Sodium hydroxide (13 g., 0.33 mole) is added. After refluxing for 7.5 hours the mixture is allowed to stand at ambient temperature for three days. The product is washed three times with dilute hydrochloric acid, and then with distilled water until the pH is neutral. After refluxing in distilled water overnight, the beads are again washed with water and then methanol. The product analizes as follows:
19.09% S
73.20% C
7.01% H Oxidation of Poly(vinylbenzyl thiol:DVB)

Poly(vinylbenzyl sulfide: DVB) on a Polymer B matrix, (about 0.75 structural unit moles), is washed three times with acetic acid, then slurried in acetic acid (150 ml). Polymer B comprises a macroreticular styrene DVB copolymer containing 12% divinylbenzene which has been obtained by the use of methyl isobutyl carbinol as extender in the amount of 31%. The mixture is heated to 40°C. and 35% hydrogen peroxide (435 g.) is added dropwise in 1.5 hours. The temperature is kept below 45°C. during the addition. The reaction is heated at 45°C. for one hour, 90°C. for 2 hours, then stirred at ambient temperature for 3 days. The product is washed thoroughly with water, 5% hydrochloric acid and then water until pH of the wash is neutral. The product has the following characteristics:

% S = 6.9
SSCC = 2.61 meq./g. dry
CEC = 5.67 meq./g. dry
% solids = 23.1

Example III

Oxidation of Poly(vinylbenzylisothiouronium chloride:DVB)

Poly(vinylbenzylisothiouronium chloride:DVB) on a Polymer B matrix, (30g. wet; 70% solids, 0.09 structural unit moles), is slurried in distilled water (200 g.) containing 50% NaOH (20 g.; pH = 13) and then stirred in an ice bath for 45 minutes. 35% hydrogen peroxide (52.6 g., 0.54 mole; 6 equivalents) is added dropwise over eight minutes with an exothermic temperature rise from 2°C. to 15°C. during the addition. The mixture is stirred at ice bath temperature for 1 hour, then at ambient temperature for 24 hours. The beads are siphoned free of the reaction mixture and washed copiously with water. The product has the following properties:

9.3% = S
1.0% = N
0.68% = Cl
54.7% = Solids
SSCC = 3.25 meq./g. dry
CEC = 3.15 meq./g. dry

We claim:
1. A method of preparing a polymeric resin having sulfonic acid functionality which comprises a first step of reacting a halomethylated polymer matrix with a thiourea to form an isothiouronium salt and a second step of oxidizing the salt to form resin having sulfonic acid functionality.
2. A method as claimed in claim 1 wherein the second step comprises the intermediate isolation of a thiol.
3. A method as claimed in claim 1 wherein the second step is carried out in the presence of hydrogen peroxide.
4. A method as claimed in claim 1 wherein the halomethylated polymer is a chloromethylated polymer.
5. A method as claimed in claim 1 wherein the polymer is a macroreticular styrene-divinylbenzene copolymer.
6. A method as claimed in claim 1 wherein the final product in benzyl sulfonic acid resin.

* * * * *